United States Patent [19]

Kemp

[11] Patent Number: 4,847,716

[45] Date of Patent: Jul. 11, 1989

[54] AUTOMATIC PROMPTING FOR CLEANING OF MAGNETIC DISK HEADS

[75] Inventor: Deborah K. Kemp, Lawrenceville, Ga.

[73] Assignee: NCR Corporation, Dayton, Ohio

[21] Appl. No.: 130,915

[22] Filed: Dec. 10, 1987

[51] Int. Cl.$^4$ .............................. G11B 5/41

[52] U.S. Cl. .............................. 360/128

[58] Field of Search .............................. 360/128, 137

[56] References Cited

U.S. PATENT DOCUMENTS

| | | | |
|---|---|---|---|
| 4,586,100 | 4/1986 | Howe et al. | 360/128 |
| 4,186,439 | 1/1980 | Shimuta | 364/405 |
| 4,245,311 | 1/1981 | Nakamuta | 364/50 |

FOREIGN PATENT DOCUMENTS

| | | | |
|---|---|---|---|
| 57-105871 | 7/1982 | Japan | 360/128 |
| 58-62819 | 4/1983 | Japan | 360/128 |
| 58-158019 | 9/1983 | Japan | 360/128 |
| 59-79421 | 5/1984 | Japan | 360/128 |
| 59-215016 | 12/1984 | Japan | 360/128 |
| 60-45923 | 3/1985 | Japan | 360/128 |

OTHER PUBLICATIONS

IBM Technical Disclosure Bulletin, vol. 26, No. 12, May 1984, "Method to Determine Tape Transport Cleaning Frequency, Based on Actual Amount of Tape Processed, with Operator Prompting Via Display".

Publication from Research Disclosure, Apr. 1987, No. 276, Kenneth Mason Publications Ltd., England, Entitled, "Adaptive Cleaner-Cartridge Message".

*Primary Examiner*—John H. Wolff
*Assistant Examiner*—Matthew J. Bussan
*Attorney, Agent, or Firm*—Wilbert Hawk, Jr.; Albert L. Sessler, Jr.; Richard W. Lavin

[57] ABSTRACT

A method for cleaning transducer heads in a magnetic disk drive located within a device such as an electronic cash register comprising the steps of storing in a memory first data identifying the number of days of operation of the device required before a transducer head cleaning operation is to occur, storing in the memory second data identifying the number of days of operation since the last transducer head clean operation, storing in the memory third data identifying the number of transducer head cleaning operations that have been performed on the transducer heads, comparing the second data with the first data, displaying information suggesting that a transducer head clean operation be performed when the second data is equal to or greater than the first data, cleaning the transducer heads and printing the third data on a record member in response to the cleaning of the transducer heads.

8 Claims, 5 Drawing Sheets

| ITEM NUMBER (52) | NUMBER OF DAYS FOR HEAD CLEAN (54) | NUMBER OF DAYS SINCE LAST HEAD CLEAN (56) | NUMBER OF HEAD CLEANS (58) |
|---|---|---|---|
| 1 | 21 | 20 | 15 |
| 2 | | 21 | 16 |
| 3 | 28 | 1 | 16 |
| | | | |
| | | | |
| | | | |

50; rows 59, 60, 62

AUTOMATIC PROMPTING FOR CLEANING OF MAGNETIC DISK HEADS

BACKGROUND OF THE INVENTION

The present invention relates to an electronic device such as an electronic cash register which processes data pertaining to a merchandise item purchased as part of a checkout operation and more particularly relates to a method for prompting the cleaning of a magnetic disk drive transducer head associated with a device such as an electronic cash register.

Floppy disk memories have been used for several years for memory devices for many computer systems. In recent years, the use of floppy disk memory devices in Point of Sale (POS) terminal systems has increased. Due to the environment in which the POS terminals are used, it has been found that one of the reasons for the failure of the disk drive units to perform their assigned tasks is the failure by operators or maintenance personnel to clean the read/write transducer heads of the drive unit. It has also been found that no information is generated as part of a terminal operation indicating whether or not the read/write transducer heads have been cleaned or how much operating time has elapsed since the last head clean operation, which information is needed by the serviceman for servicing the drive unit.

It is therefore a principal object of this invention to provide a method for indicating when the read/write transducer heads of a disk drive unit are required to be cleaned.

It is another object of this invention to provide a method for generating a record listing the number of times that the read/write heads of a disk drive unit have been cleaned and the time interval since the last head cleaning operation.

SUMMARY OF THE INVENTION

These and other objects of the invention are fulfilled by storing in a memory in a device such as an electronic cash register or other terminal device at the time the device is initiated for operation, the number of days of operation required between magnetic disk head cleans, the number of days since the last cleaning of the transducer head had occurred and the number of head cleans that have occurred. Knowledge as to the number of head cleans which have occurred is helpful in determining adequacy of maintenance. The value representing the number of operating days that have elapsed since the last head clean is incremented by one at the end of each operating day. If the number of operating days that have elapsed since the last head clean operation is less than the number of operating days required to occur between head cleans, the operation of the terminal device during that day of operation will continue. If the number of operating days since the last head clean is equal to or greater than the number of operating days required to run between head cleans, a display on the terminal device is energized to display a logo indicating that the read/write heads of the disk drive unit associated with the terminal device are required to be cleaned. If the operator chooses not to perform a head clean at this time, the operator actuates a first key on the keyboard and the operation of the terminal device is continued. The operator indicates that a head cleaning operation is to occur by actuating a second key on the keyboard which results in the display displaying the logo to insert a head cleaning disk into the drive unit. The number of head cleans that have been performed up to this point is then printed on a record member. A head clean operation is then caused to take place by the operator manually inserting a special head clean disk into the slot of the disk unit. The number of head cleans that have been performed is then incremented by one and the number of operating days that has elapsed since the last head clean is then reset to zero, after which the operation of the terminal device continues in a normal manner.

BRIEF DESCRIPTION OF THE DRAWINGS

Additional advantages and features of the present invention will become apparent and will be fully understood from the reading of the following description, taken in conjunction with the drawing, in which.

DESCRIPTION OF THE PREFERRED EMBODIMENT

Figure 1:
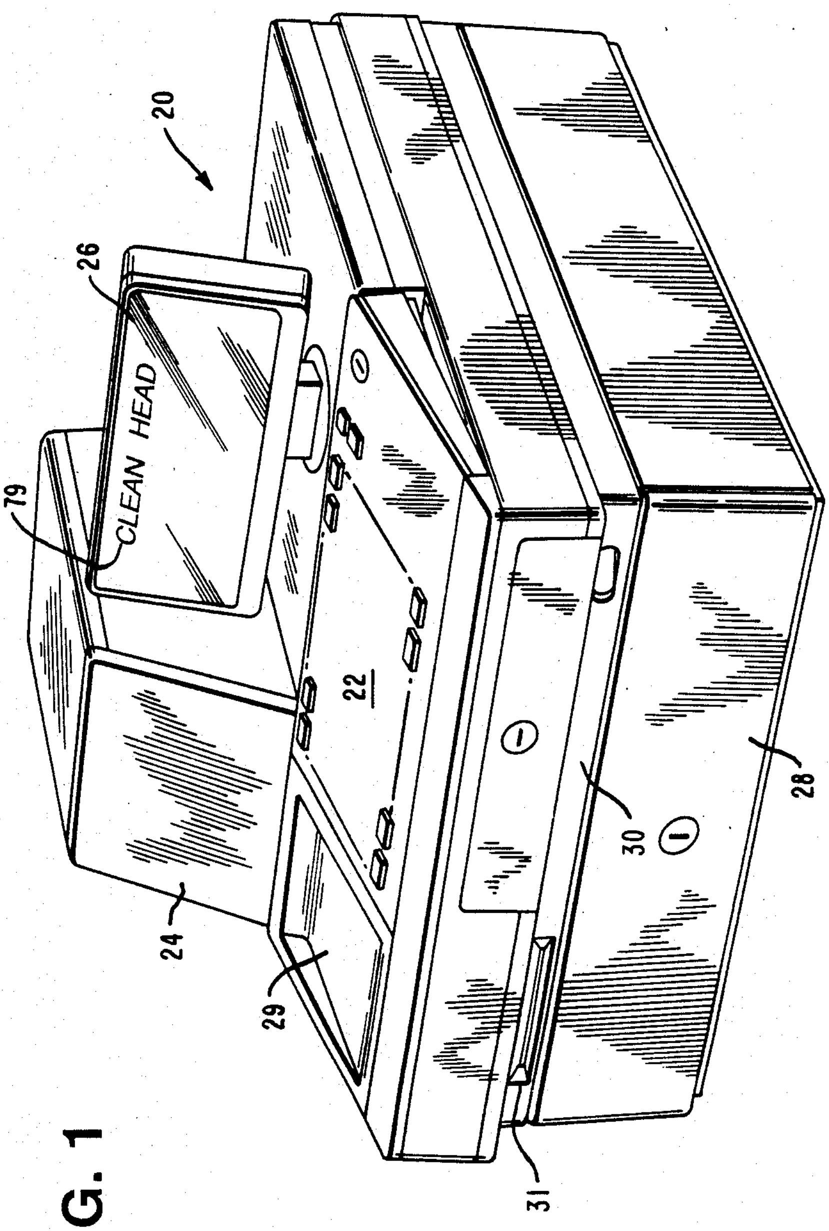
FIG. 1 is a perspective view of an electronic cash register or terminal device used in the present checkout system.

Referring now to FIG. 1, there is shown a perspective view of the electronic cash register used in the present invention generally indicated by the numeral 20, which includes a keyboard 22, a display 26 extending from the top of the cash register, a printer 24 mounted on the left side of the keyboard and a cash drawer 28 which forms a support for the cash register. It will be understood that the present invention is not limited to use in an electronic cash register, since it could be used in any business terminal or other electronic device employing a magnetic disk drive unit and a display. Positioned adjacent the keyboard 22 and the printer 24 is a slot 29 in which a receipt record member (not shown) moves to a position to be removed by the operator of the cash register for presentation to the customer at the conclusion of a merchandise checkout operation. A record member may also be dispensed from this slot which may contain information pertaining to the cleaning of the read/write heads of a magnetic disk memory unit. Further, located in a front wall portion 30 of the cash register 20 is a slot 31 in which is inserted a floppy disk (not shown) for positioning within a magnetic disk drive unit 44 (FIG. 3) located within the electronic cash register 20.

Figure 2:
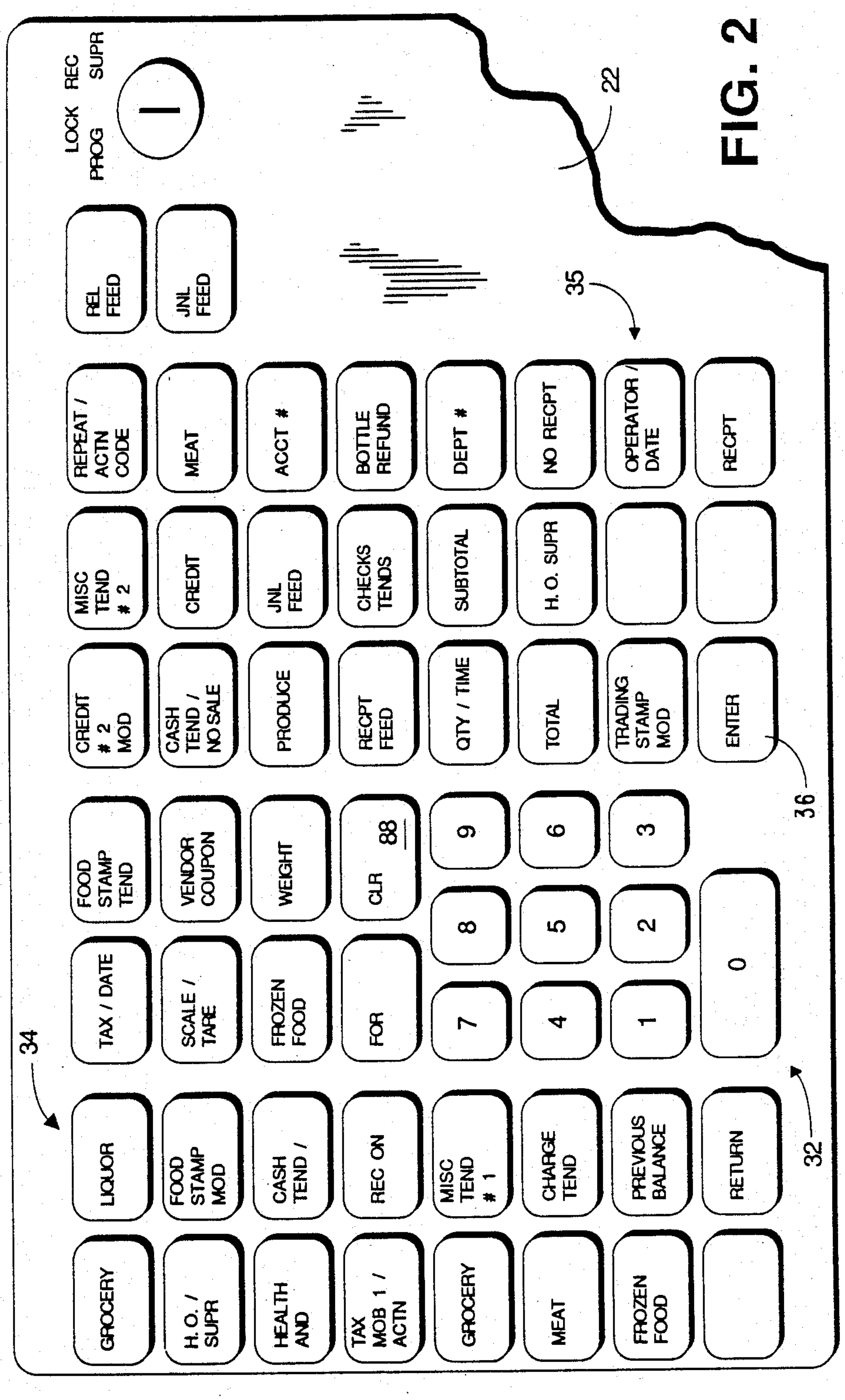
FIG. 2 is a plan view of the keyboard of the electronic cash register shown in FIG. 1.

Referring now to FIG. 2, there is shown a plan view of the keyboard 22 which includes a 10-key portion 32 comprising a number of conventional numerical keys on which are located indicia indicating the numbers 0–9 inclusive. The keyboard 22 further includes a number of rows of transaction keys 34 which are used to identify the department from which the purchased merchandise items originated, together with other rows of control keys 35 used in totaling the checkout operation. Included among the control keys is an "ENTER" key 36 used to generate data pertaining to the cleaning of the read/write heads of the magnetic disk drive unit in a manner to be described more fully hereinafter.

Figures 3, 4:
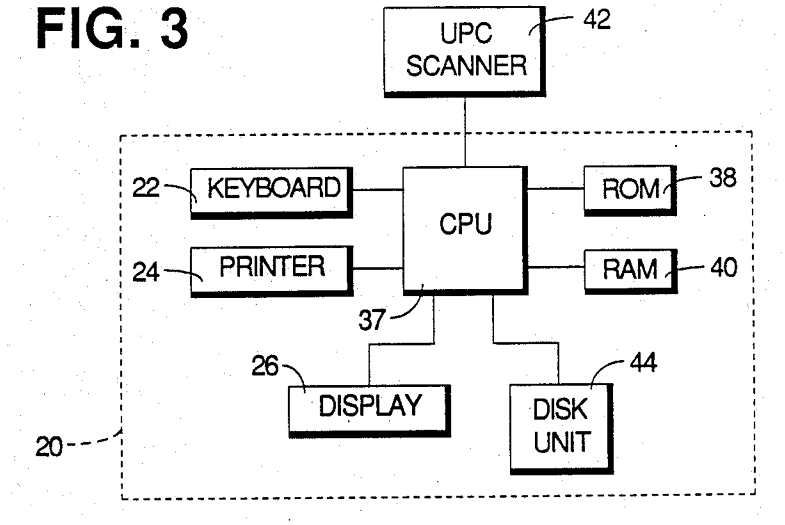
FIG. 3 is a schematic block diagram of the electronic cash register employed in a checkout system which includes a magnetic disk drive unit together with a remotely located optical scanner.
FIG. 4 is an illustration showing a portion of the memory in the cash register in which are stored the various records including data pertaining to a head cleaning operation.

Referring now to FIG. 3, there is shown a block diagram of the electronic cash register or terminal device 20 together with a remotely located UPC optical scanner 42 which interacts with the cash register 20 to provide a checkout operation of the purchased merchandise item. Included in the cash register 20 is a central processor unit (CPU) 37 which controls the printer 24 and the display 26. Associated with the CPU 37 is a ROM memory unit 38 in which is located the application software for operating the cash register 20 and a RAM memory unit 40 in which data pertaining to a head cleaning operation and temporary totals are stored as part of the end-of-day processing. Also mounted within the cash register 20 is a magnetic disk read/write drive unit 44 in which is located a magnetic disk on which is stored data used in determining when a magnetic disk head cleaning operation is to be performed, as will be described more fully hereinafter. The UPC scanner 42 scans a UPC label located on the purchased merchandise item for generating data identifying the purchased merchandise item by means of which the price of the merchandise item is extracted from the floppy disk in the drive unit 44 in a manner that is well known in the art. As will be described more fully hereinafter, the CPU 37 operates the display 26 in response to the program stored originally on the floppy disk located in the magnetic disk drive unit 44 and transferred to the RAM memory unit 40 to notify the operator of the cash register 20 that a head cleaning operation is to be performed.

Referring now to FIG. 4, there is shown a portion 50 of the RAM memory 40 (FIG. 3), showing the type of data that is transferred from a floppy disk located in the disk drive unit 44 (FIG. 3) and stored in the memory 40 in accordance with the present invention. A plurality of records 59, 60 and 62 are shown, each extending horizontally in the diagram of FIG. 4, and including an entry in each of four columns 52, 54, 56 and 58. Each record represents a separate transaction relating to head cleaning, such as an additional day of operation. The records provide a history relating to the head cleaning operation. The first column 52 headed "ITEM NUMBER" includes a binary data item in the first record 59 identifying the location of the first record 59 stored in the memory 50. In the next column 54, there is stored an item representing the number of operating days of the cash register 20 that are required to elapse before the next head cleaning operation is to be performed. In the next column 56, an item representing the number of operating days since the last head clean operation was performed is stored. In column 58, there is stored an item representing the number of head cleans that have been performed on the present disk drive unit 44.

Figure 5A:
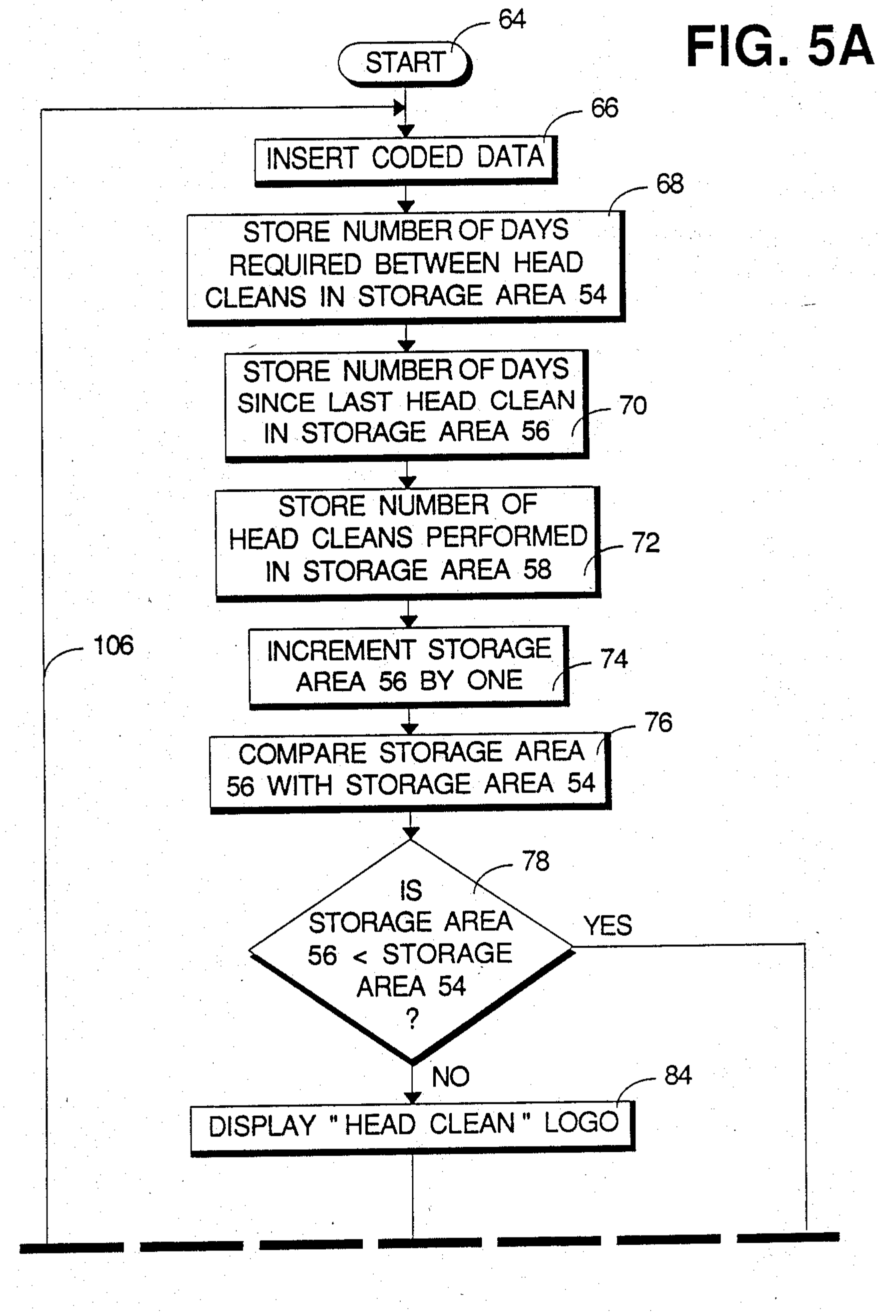
FIGS. 5A and 5B show a flow chart of one embodiment of the present invention.
Figure 5B:
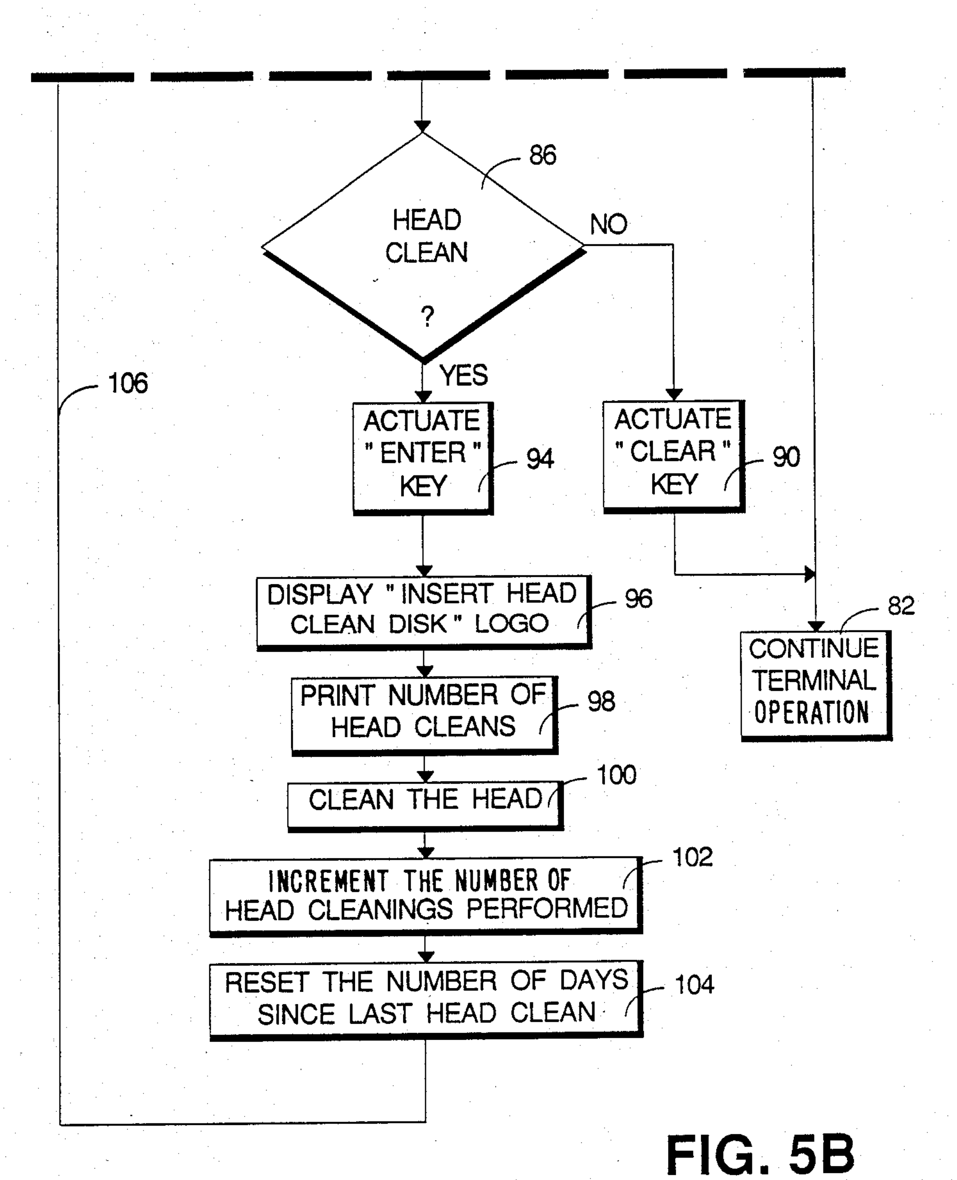

Referring now to FIGS. 5A and 5B, there is shown a flow chart of the head cleaning operation of the present invention. The operation starts (block 64) at the time the terminal device is initiated for operation by the operator of the cash register or terminal device inserting coded data, also called an action code, which initiates end-of-day programming for the terminal (block 66), into the terminal device 20 by indexing the appropriate keys 32 (FIG. 2) on the keyboard 22 together with the control key 36. In response to the insertion of the coded data into the terminal device, the CPU 37 (FIG. 3) will access the data stored on the floppy disk inserted within the disk drive unit 44 (FIG. 3) and will store in the RAM memory unit 40 (FIG. 3) the record 59 comprising the number of days of operation of the cash register required between transducer head cleans in column 54 of the memory portion 50 (FIG. 4) (block 68); the number of days of operation since the last transducer head clean in column 56 (block 70) and the number of head cleans performed prior to the insertion of the coded data in column 58 (block 72). The CPU 37 will then increment the value in column 56 by one (block 74) in the next record 60, which represents the next transaction relating to head cleaning, compare the value stored in column 56 with the value stored in column 54 (block 76) and determine if the value stored in column 56 is less than the value stored in column 54 (block 78). If the number of days of operation since the last transducer head clean is less than the number of days required between transducer head cleans, the terminal device 20 will continue in its normal mode of operation (block 82). If the number of days that has occurred since the last transducer head clean is equal to or greater than the number of days required between transducer head cleans, the CPU 37 will then control the display 26 to display the logo "HEAD CLEAN" (block 84). At this time, the operator has the election of either performing a head clean operation or ignoring the head clean operation. If a head clean is not to be performed, the operator will actuate the "CLEAR" key 88 (FIG. 2) on the keyboard 22 (block 90). If a head clean is to be performed, the operator will actuate the "ENTER" key 36 (FIG. 2). The system will check (block 86) to see if a head clean operation is going to be performed. If it is not, the system will continue to be operated in a normal operation (block 82). If a head clean operation is to occur, the CPU, in response to the operation of the "ENTER" key 36, will control the display 26 (FIG. 1) to display the logo "INSERT HEAD CLEANING DISK" (block 96) and will control the printer 24 (FIG. 3) to print the number of transducer head cleans that have been performed (block 98) which is stored in column 58 in the memory 50 (FIG. 4). The transducer heads are then cleaned by the insertion of the head cleaning disk (not shown) within the slot 31 (FIG. 1) in the terminal device 20 (block 100). In response to the cleaning of the transducer heads, the CPU will increase the number of head cleans performed which is stored in column 58 (FIG. 4) by one (block 102) in the record 60, reset the number of days since the last head clean which is stored in column 56 (FIG. 4) (block 104) to one in a new record 62 and then return over line 106 to the operating condition awaiting the insertion of the coded data (block 66) at the next start of operation of the terminal device.

It will be seen from FIG. 4 that the number of days of operation required for a transducer head cleaning operation, which is stored in column 54, can be easily changed, if desired, as shown for example in record 62, without affecting the software steps.

The major advantage of this system is the automatic prompting in the display of the logo "HEAD CLEAN" which reminds the operator to run a head clean operation, thus eliminating the need for store personnel to remember to perform this operation. Since the number of head cleans performed on the transducer heads is printed and stored in column 58 (FIG. 4) this information can be used by the service engineer to determine if the head clean operation is being performed as often as necessary, thus providing a accurate diagnostic routine which can reduce the time servicing possible malfunctioning of the disk drive.

While the features of the invention have been illustrated and described, it should be readily apparent to those skilled in the art that many changes and modifications can be made in the method of the invention presented without departing from the spirit and scope of the invention. Accordingly, the present invention should be considered as encompassing all such changes and modifications of the invention that fall within the broad scope of the invention as defined by the appended claims.

What is claimed is:

1. A method for cleaning at least one transducer head in a magnetic disk drive member located within an operator actuated device comprising a keyboard having a plurality of keys thereon, a memory and a display, comprising the steps of:

storing in the memory a first item comprising first data identifying the number of days of operation of the device required before a transducer head cleaning operation is to occur;

storing in the memory a second item comprising second data identifying the number of days of operation since the last transducer head clean operation;

storing in the memory a third item comprising third data identifying the number of transducer head cleaning operations that have been performed on the transducer head in the disk drive member;

comparing the second data with the first data;

displaying request information requesting that a cleaning operation be performed when the second data is equal to or greater than the first data;

displaying cleaning operation instructions if the operator indicates a desire to perform said cleaning operation by actuating the appropriate key or keys in response to said request information; or continuing operation of the device if the operator indicates a desire not to perform said cleaning operation by actuating the appropriate key or keys in response to said request information.

2. A method for cleaning at least one transducer head with a head cleaning disk inserted by an operator in a magnetic disk drive member located within an operator actuated device comprising a keyboard having a plurality of keys thereon, a memory and a display, said method comprising the steps of:

storing in the memory a first item comprising first data identifying the number of days of operation of the device required before a transducer head cleaning operation is to occur;

storing in the memory a second item comprising second data identifying the number of days of operation since the last transducer head cleaning operation;

storing in the memory a third item comprising third data identifying the number of transducer head cleaning operations that have been performed on the transducer head in the disk drive member;

comparing the second data with the first data;

displaying request information requesting that a cleaning operation be performed when the second data is equal to or greater than the first data;

cleaning the transducer head with said head cleaning disc which is inserted by the operator in response to said request information;

incrementing the third data by one; and reducing the value of the second data to zero.

3. The method of claim 2, which further includes the step of displaying cleaning operation instructions to the operator if the operator indicates a desire to perform said cleaning operation by actuating the appropriate key or keys in response to said request information.

4. The method of claim 3, in which the step of cleaning the transducer head with said head cleaning disc which is inserted by the operator further includes the step of printing the third data on a record member in response to an operator actuating the appropriate key or keys on the keyboard.

5. A method for cleaning a transducer head with a head cleaning disk inserted by an operator in a magnetic disk drive member located within an operator actuated device comprising a keyboard having a plurality of keys thereon, a memory and a display, said method comprising the steps of:

storing in the memory a first item comprising first data identifying the number of days of operation of the device required before a transducer head cleaning operation is to occur;

storing in the memory a second item comprising second data identifying the number of days of operation since the last transducer head cleaning operation;

storing in the memory a third item comprising third data identifying the number of transducer head cleaning operations that have been performed on the transducer heads in the disk drive member;

comparing the second data with the first data;

displaying request information requesting that a transducer head cleaning operation is required to be performed when the second data is equal to or greater than the first data; and continuing operation of the device if the operator indicates a desire not to perform said transducer head cleaning operation by actuating the appropriate key or keys in response to said request information.

6. The method of claim 5, which further includes the step of displaying cleaning operation instructions to the operator if the operator indicates a desire to perform said cleaning operation by actuating the appropriate key or keys in response to said request information.

7. The method of claim 6, which further includes the step of printing the third data on a record member in response to the actuation of the appropriate key or keys on the keyboard.

8. A method for cleaning at least one transducer head with a head cleaning disk inserted by an operator in a magnetic disk drive member located within an operator actuated device comprising a keyboard having a plurality of keys thereon, a memory and a display, said method comprising the steps of:

storing in the memory a first item comprising first data identifying the number of days of operation of the device required before a transducer head cleaning operation is to occur;

storing in the memory a second item comprising second data identifying the number of days of operation since the last transducer head cleaning operation;

storing in the memory a third item comprising third data identifying the number of transducer head cleaning operations that have been performed on the transducer heads in the disk drive member;

comparing the second data with the first data;

displaying request information stating that a transducer head cleaning operation is required to be performed when the second data is equal to or greater than the first data;

cleaning the transducer head in response to the displaying of the information requesting that a head cleaning operation be performed;

incrementing the third data by one;

reducing the value of the second data to zero; or continuing terminal operation if the operator indicates a desire not to perform said cleaning operation by actuating the appropriate key or keys in response to said request information.

* * * * *